UNITED STATES PATENT OFFICE.

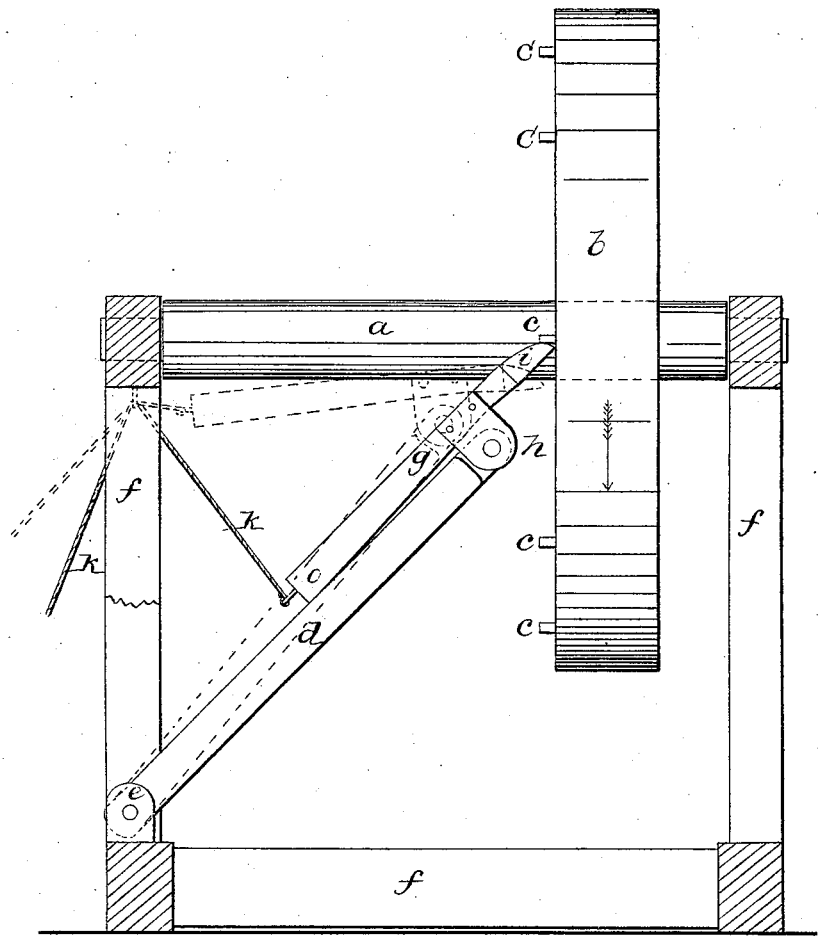

LORENZO D. RUNDELL, OF SOUTH WESTERLO, NEW YORK.

IMPROVED PAWL FOR HAY-PRESSES.

Specification forming part of Letters Patent No. 37,643, dated February 10, 1863.

*To all whom it may concern:*

Be it known that I, LORENZO D. RUNDELL, of South Westerlo, in the county of Albany and State of New York, have invented, made, and applied to use a certain new and useful Improvement in Pawls for Hay-Presses, &c.; and I do hereby declare the following to be a full, clear, and exact description of my said invention, reference being had to the annexed drawing, making part of this specification, wherein I have represented a side view of my said pawl as applied to the wheel, to be held thereby.

In hay-presses and many other characters of machinery the rotary motion communicated to a wheel and axle is retained by a pawl. The moving end of this pawl, taking the teeth or projections of the wheel to retain the same, is so firmly held by the friction and strain thereon, as well as passing in some instances partially beneath the tooth, that the pawl cannot be withdrawn until the wheel itself is moved to relieve the end of said pawl. In presses particularly this is a great inconvenience, because after the bale has been pressed and banded or roped the press has again to be started before it can be relieved and allowed to run back upon withdrawal of the pawl holding the parts.

The nature of my said invention consists in a compound pawl that will retain the movement as given to a wheel by taking teeth or projections thereon in a manner similar to any pawl, but which can be moved away and disconnected from the teeth of the wheel, while the pressure still remains upon the moving end of the pawl, thereby avoiding the necessity, heretofore existing, of relieving the pawl from pressure before the same could be moved.

This invention is especially adapted to hay-presses such as those patented April 25, 1844, by C. F. Paine.

In the drawing, $a$ is the shaft or axle of the ratchet-wheel $b$, said wheel being provided with teeth or projections either on the side or on the periphery. I have represented blocks $c$ $c$ as on the side of the wheel taking the pawl.

$d$ is the body of the pawl, moving on the joint $e$ upon the frame $f$, or in any other convenient place. $g$ is a pawl-lever jointed to the end of the pawl-body, as at $h$, and the point $i$ of said pawl-lever takes the teeth or projections $c$ $c$, and the rear end, $o$, of said pawl-lever is provided with a cord or chain, $k$, passing to a convenient position for the attendant. It will be seen that when in the position of the full lines shown in the drawing the pawl acts, as is usual with other pawls, in dropping behind each successive tooth or projection; but when the end $o$ of the lever-pawl $g$ is moved away from the body part $d$ the toggle-joint formed by the pawl is broken or relieved, so that the end $i$ of the pawl draws away from under the tooth or block $c$, and the wheel $b$ is at liberty to turn in the direction of the arrow, the compound pawl standing in the position shown by dotted lines. When the lever-pawl $g$ is allowed to drop, the end $o$ falls against $d$ before the end $i$ takes the wheel $b$; hence this compound pawl is in position ready for use when it takes the teeth or projections of the wheel.

What I claim, and desire to secure by Letters Patent, is—

The compound pawl formed by the lever $g$ and body part $d$, jointed together at $h$, and acting in the manner and for the purposes specified.

In witness whereof I have hereunto set my signature this 22d day of December, 1862.

LORENZO D. RUNDELL.

Witnesses:
JOHN B. TAETS,
DARIUS RUNDELL.